March 23, 1971  S. G. LLOYD ET AL  3,572,360
PNEUMATIC CONTROLLER
Filed July 25, 1969  4 Sheets-Sheet 1
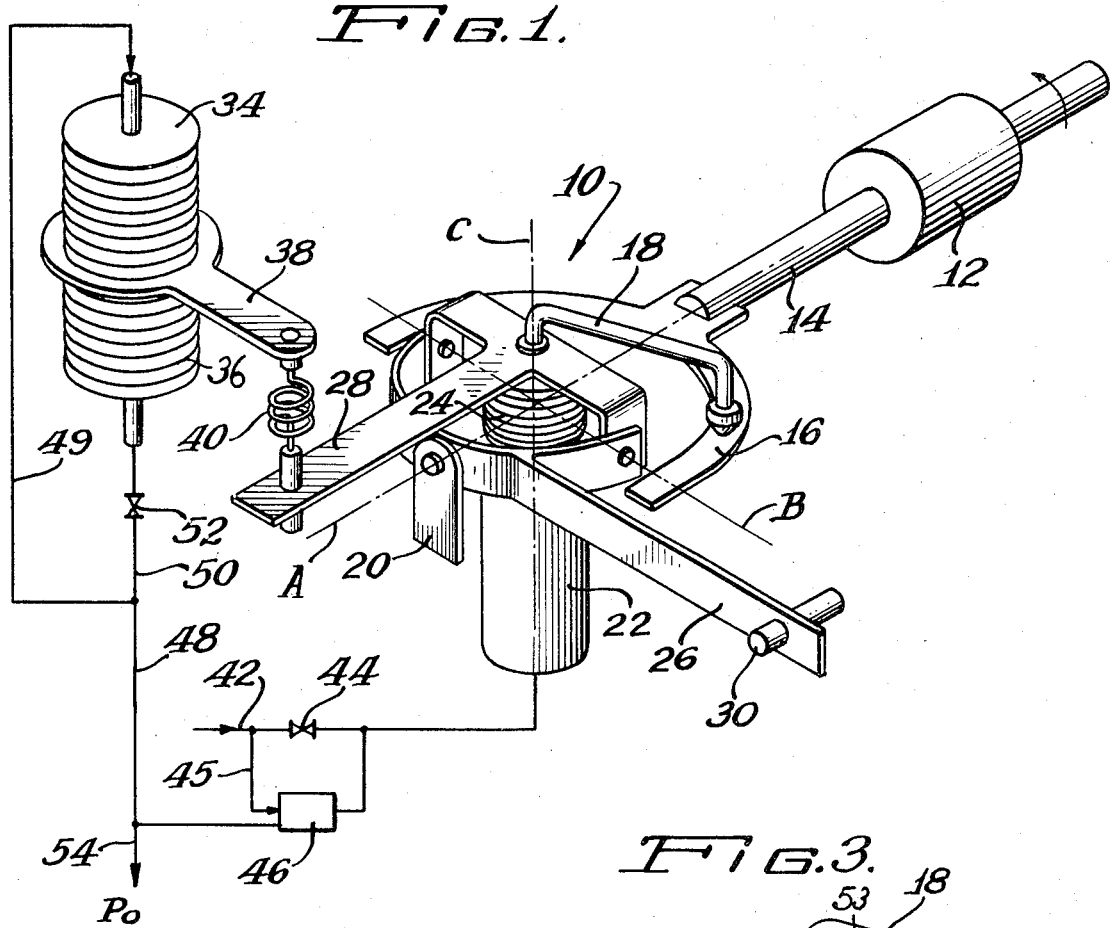
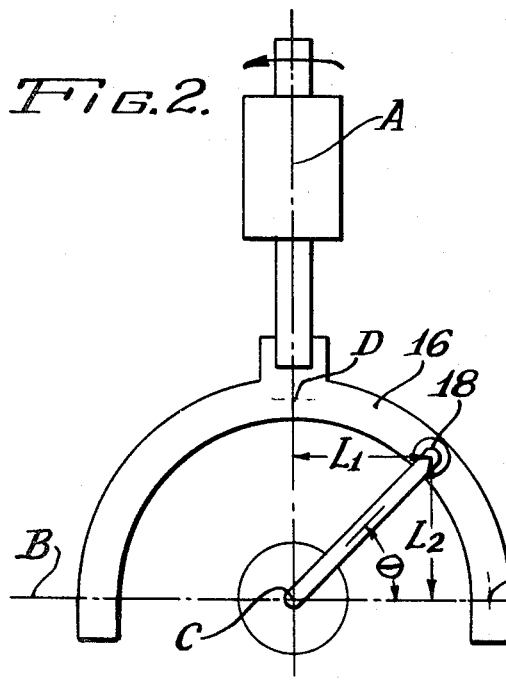
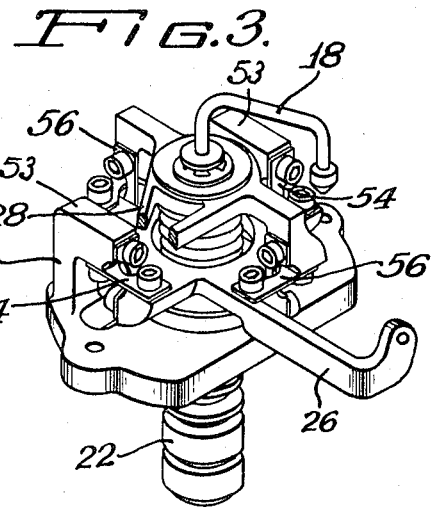
Inventors:
Sheldon G. Lloyd
Jerry B. Trottmann
By
Sair, Freeman & Molinare
Attys.

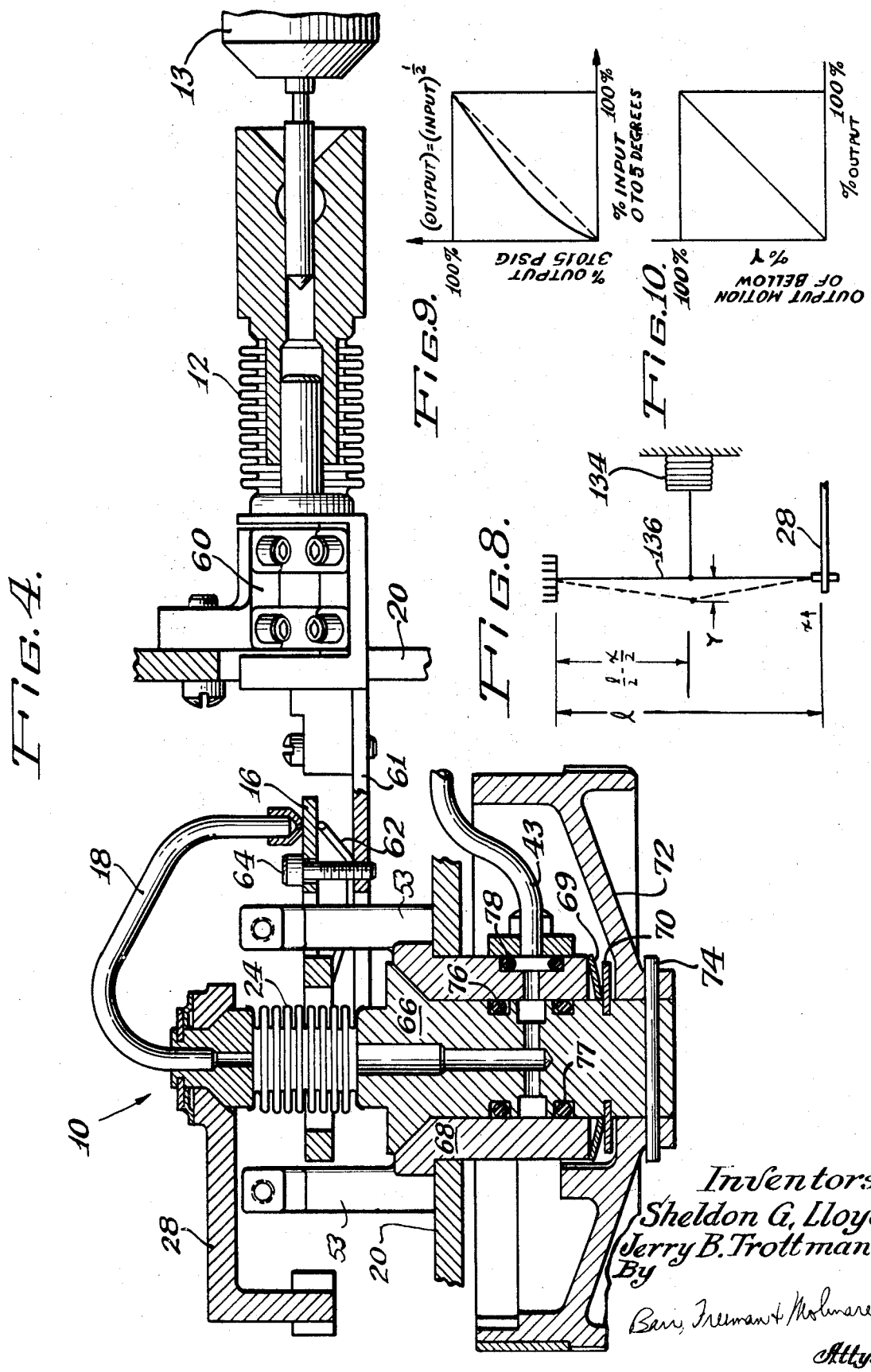

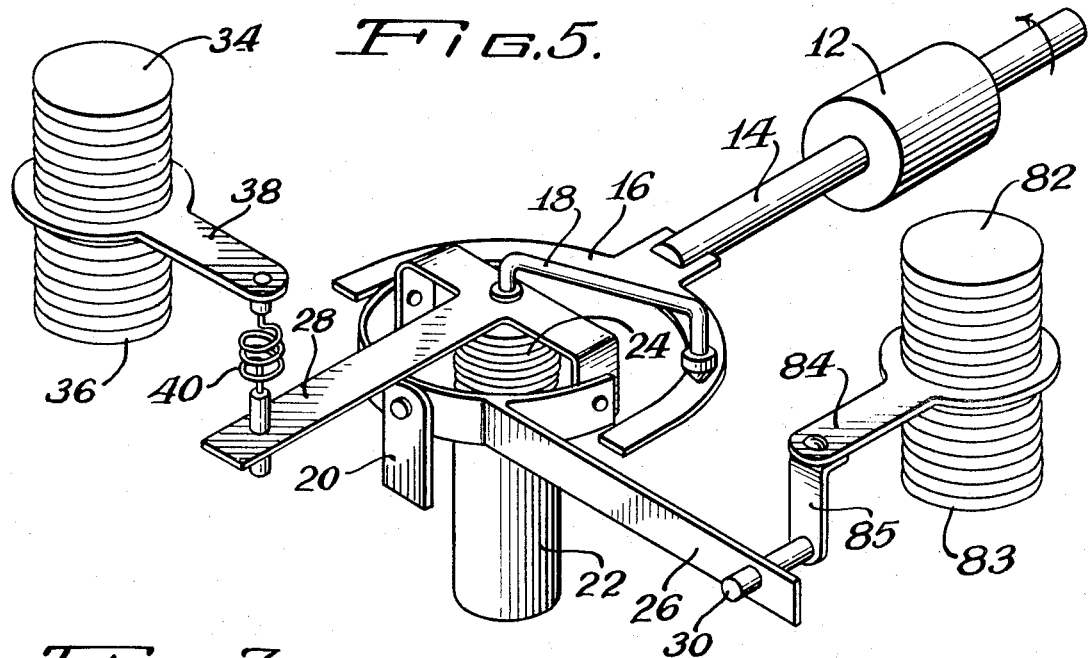
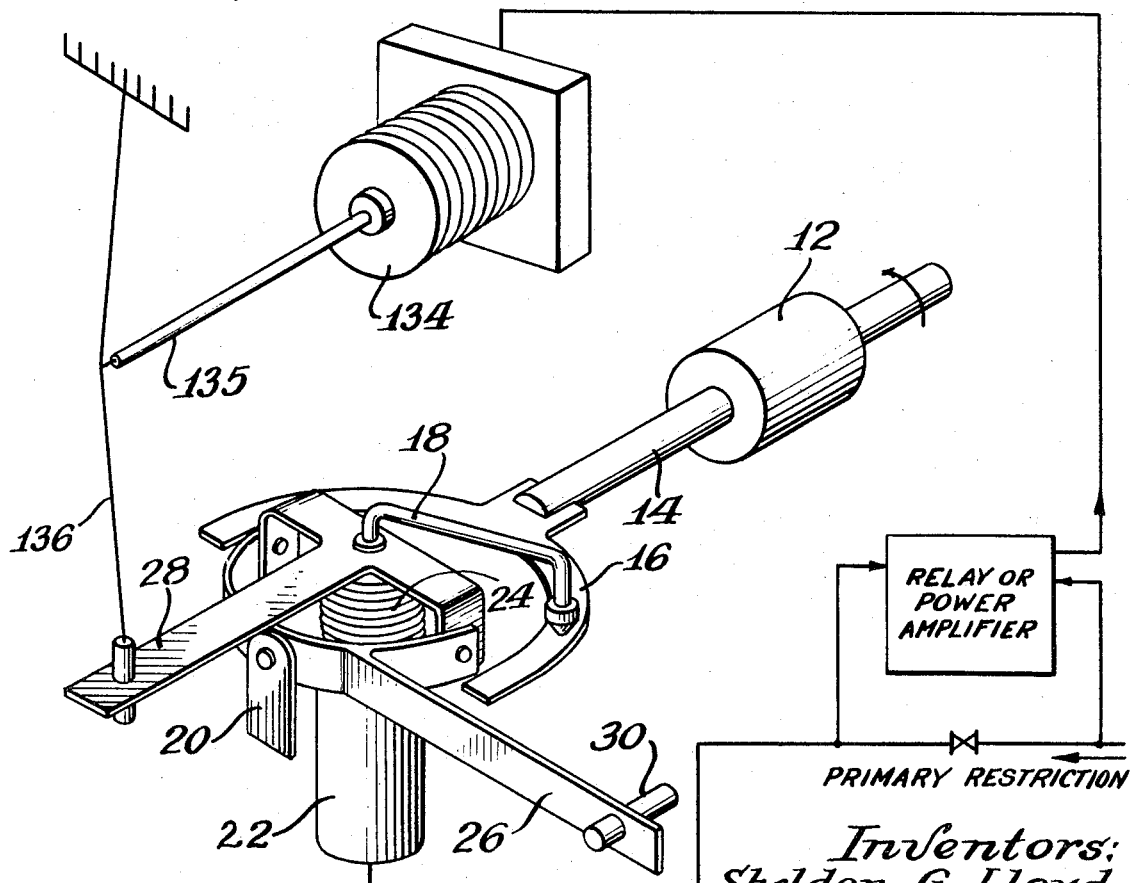

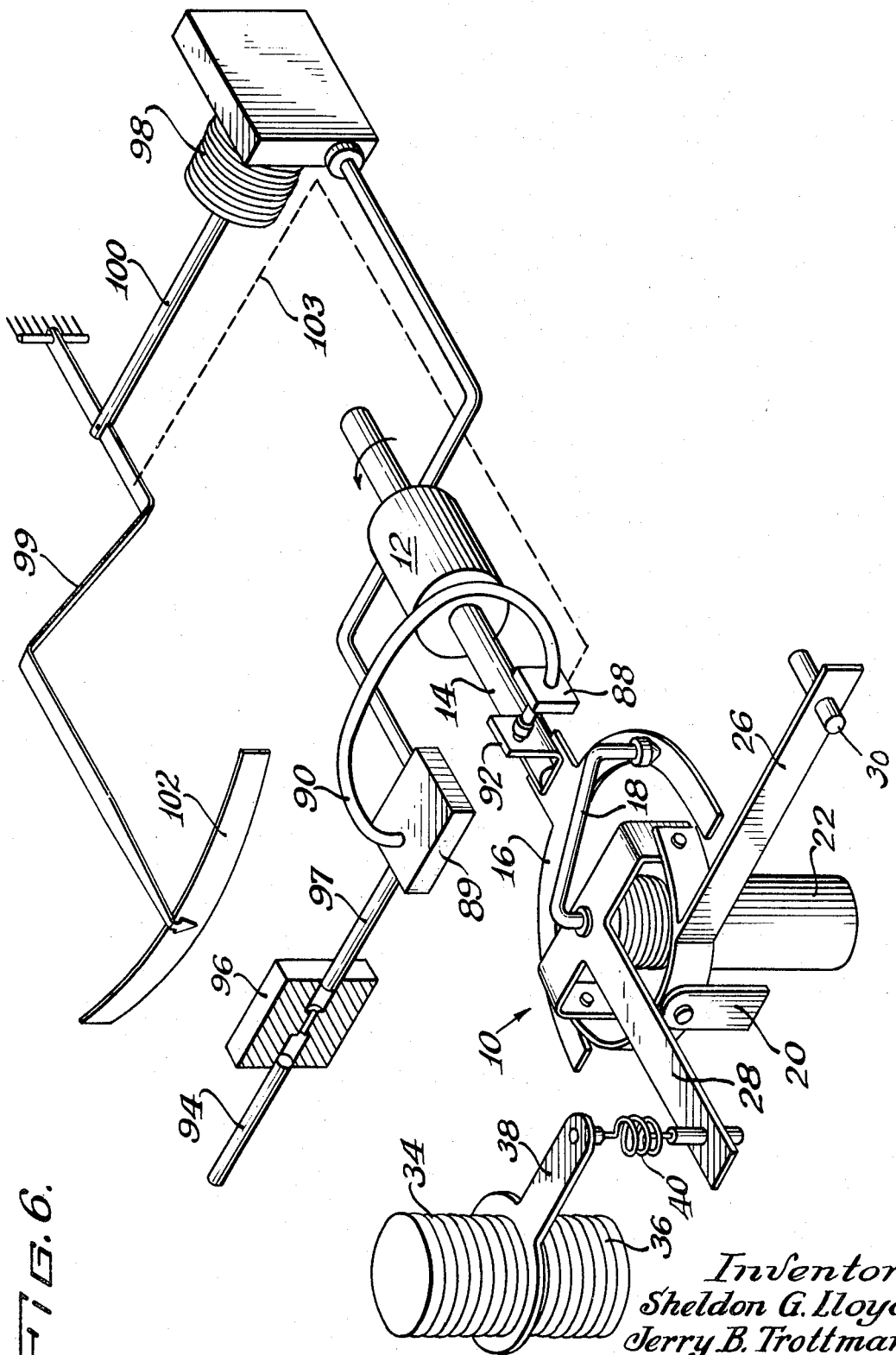

United States Patent Office 3,572,360
Patented Mar. 23, 1971

3,572,360
PNEUMATIC CONTROLLER
Sheldon G. Lloyd and Jerry B. Trottmann, Marshalltown, Iowa, assignors to Fisher Governor Company
Filed July 25, 1969, Ser. No. 845,023
Int. Cl. F15b 5/00; G05d 16/00
U.S. Cl. 137—86                    13 Claims

ABSTRACT OF THE DISCLOSURE

A pneumatic controller comprising a gimbal assembly having first and second levers each pivotal about an axis. A flapper rotatable about the axis of the first lever cooperates with a nozzle rotatable adjustably about a third axis. The three axes are arranged substantially at right angles to one another.

SUMMARY OF THE INVENTION

This invention relates to control apparatus, and more particularly, to a pneumatically operated controller for use in automatic regulation which is applicable to a variety of process variables.

The basic components of an automatic process controller of the pneumatic type are commonly a mechanism for sensing deviation from a desired norm, a flapper nozzle motion sensing transducer for translation of mechanical motions to fluid pressures, a fluid operated relay or pilot valve for pressure amplification, a feedback mechanism and mechanism for setting a predetermined gain of a control system. Other elements may be added to the basic system, as for example, provision for reset.

An object of the present invention is to provide an improved pneumatic controller mechanism of relatively simple compact design which is readily adjustable for a wide range of process conditions and adaptable to the several modes of automatic control opreation.

A further object of the present invention is to provide an improved pneumatic controller that may be readily adapted as a square root extractor.

A further object of the present invention is to provide an improved pneumatic controller incorporating a gimbal mechanism coupled with a movable nozzle operatively associated with a semi-circular flapper mechanism. Other objects and advantages of the present invention will be made more apparent hereinafter.

BRIEF DESCRIPTION OF THE DRAWING

Presently preferred embodiments of the present invention are shown in the attached drawing wherein:

FIG. 1 is a schematicized perspective view illustrating the basic principles of a new pneumatic controller embodying principles of the present invention;

FIG. 2 is a plan view of components of the pneumatic controller of FIG. 1;

FIG. 3 is a perspective view of the pneumatic controller, illustrating the flexure pivot connections of certain components of the gimbal assembly;

FIG. 4 is a cross-sectional view illustrating the cooperative relationship of components of the pneumatic controller of FIG. 1;

FIG. 5 is a schematicized perspective view of a receiver controller embodying principles of the present invention;

FIG. 6 is a schematicized perspective view of a process indicator embodying principles of the present invention;

FIG. 7 is a schematicized perspective view illustration of a square root extractor embodying principles of the present invention;

FIG. 8 is a schematic illustration of the relationship between the flexure member and the feedback bellows of the square root extractor of FIG. 7;

FIG. 9 is a graph of percent of output versus percent of input for the square root extractor of FIG. 7; and FIG. 10 is a graph of output motion of bellows versus percent of output pressure for the square root extractor of FIG. 7.

DETAILED DESCRIPTION OF THE PREFERRED EMBODIMENTS OF THE INVENTION

Referring now to FIG. 1, there is illustrated schematically a first embodiment of a pneumatic controller 10 embodying the present invention. The main components of the pneumatic controller 10 include an input member 12 rotatable about an input axis A in response to a first condition, as for example, a liquid level sensor or a pressure sensor. In one form of the invention, the input member 12 is adapted to be connected to the torque tube rotary shaft of a Fisher Governor LEVELTROL control member. Secured to the shaft 14 carrying the input member is an arcuate flapper 16.

The flapper 16 which is shown as a semi-circular annulus, is adapted to cooperate with a nozzle 18 which is rotatably mounted with respect to the support of the pneumatic controller 10 about a gain axis indicated at C.

Rotation of the member 22 will cause rotation of the flexible bellows 24 disposed between the member 22 and the nozzle 18 so as to position the nozzle 18 relative to axes A and B. Movement of the nozzle with respect to axes A and B will adjust the gain or proportional band of control action.

It is noted that the input axis A and the feedback axis B are at right angles to one another. The gain axis C is generally at right angles to each of the other axes and in one present embodiment the components are designed so that the parts are movable in use within ±5° from a true right angular relationship.

The pneumatic controller includes a first gimbal arm 26 adapted to be pivoted about the input axis A and a second gimbal arm 28 carried on the first gimbal arm 26 and adapted to be pivoted about the feedback axis B. It is readily appreciated that pivotal motion of the first and second gimbal arms will cause deviation in the position of the nozzle 18 relative to the flapper 16.

The set point of the pneumatic controller may be adjusted by positioning the pin 30 on the end of the first gimbal arm 26 up or down. This may be done, for example, by means of spring and threaded nut adjustment members acting upon the pin 30. The set point adjustment will cause pivoting of the first gimbal arm 26 about the input axis A so as to establish a first position of the nozzle 18 relative to the flapper 16.

The second gimbal arm 28 is adapted to be acted upon by pneumatic means which include a feedback bellows 34 and a reset bellows 36 acting upon an arm member 38 adapted to be connected to the gimbal arm through a universal joint, for example, a spring means 40.

Pneumatic pressure as, for example, from a 20 p.s.i. supply source passes through the conduit 42 and a fixed primary restriction 44 to the nozzle 18. Supply pressure also passes through a conduit 45 to a relay or power amplifier 46 and then through a conduit 48 and 49 to the feedback bellows 34 and via a conduit 50 having a variable reset restriction 52 therein to the reset bellows 36. The output pressure from the pneumatic controller passes through a conduit 54.

Reference may now be made to FIGS. 1 and 2 for explanation of the function of the pneumatic controller of FIG. 1. It is seen in FIG. 2 that two points are delineated on the flapper, namely, point D and point E. Point D represents the nozzle location for minimum gain or broadest proportional band setting. Point E illustrates the nozzle location for maximum gain or narrowest proportional band setting. Following is a description of what happens to cause the desired output pressure change in response to the input. Assume that the input rotational motion is as shown in FIG. 2 and the nozzle 18 is in the position shown with respect to the flapper 16. Further, let us assume that when there is a 3 p.s.i., output pressure, the input will be zero degrees. If the flapper 16 is caused to move from this position, then the gap between the nozzle 18 and the flapper 16 will be reduced, thus causing an increase in nozzle pressure. Since the flow through the nozzle is equal to the flow through the primary restriction 44, the pressure drop across the nozzle 18 must increase as the gap between the nozzle 18 and the flapper 16 is decreased. This increased nozzle pressure acts on a relay or power amplifier 46 to amplify the flow rate and pressure. The relay output pressure change is usually some factor such as 2 to 1, 3 to 1 or 30 to 1 of the nozzle pressure change. The output of the relay therefor is the output of the device.

The output pressure $P_o$ is directed to the feedback bellows via lines 48 and 49, which acts on the feedback beam 38 operatively connected to the second gimbal arm 28 through the spring 40 to reposition the nozzle 18 at a new equilibrium position. The output pressure $P_o$ is also directed to a reset restriction 52 in conduit 50 to the reset bellows 36. The adjustable restriction 52 associated with the reset bellows 36 provides an integral or reset control function.

The gain of the pneumatic controller is proportional to the cotangent of $\theta$ as seen in FIG. 2. The input motion at the nozzle is a function of L1. The feedback motion at the nozzle is a function of L2. As the angle $\theta$ varies over the mid-range, the input and feedback motions are varied inversely.

Referring now to FIGS. 3 and 4, there is shown a typical pneumatic controller embodying the present invention. The input shaft assembly 12, 14 is adapted to be connected to a suitable input member, for example, the torque tube rotary shaft of a level sensor or a pressure sensors as, for example, a Bourdon tube. The input shaft assembly 12, 14 is supported for rotation on the gimbal base or support 20 by a suitable means, as for example, flexure strips 60 as shown in FIG. 4. Carried on an end of the input shaft 12 is a flapper support 61 upon which the flapper 16 is connected by means of the spring 62 and the bolt 64. The flapper 16 is resiliently supported to provide breakaway in the event the nozzle engages the flapper 16. The arrangement also provides for leveling of the flapper plane relative to the nozzle plane during initial calibration of the device.

The support or base 20 includes spaced apart posts 53 to which flexure strips 54 are secured for pivotally connecting gimbal arm 26 to the base 20 for rotation about axis A. Flexure strips 56 are secured between gimbal arms 26 and 28 for pivotally connecting gimbal arm 28 to gimbal arm 26 for rotation about axis B. The flexure strips each comprise relatively than metal links that may flex in operation and function as a pivotal connection between respective components of the pneumatic controller.

The nozzle 18 which cooperates with the flapper 16 is connected to the second gimbal arm 28. The second gimbal arm 28 is operatively connected to the tubular member 66 which is in turn journalled for rotation within the bearing member 68. The member 66 is retained within the bearing 68 secured to the gimbal base 20 by means of a Belleville spring 69 and retaining ring 70. A gain adjustment knob 72 is affixed to the end of the shaft 66 by means of a retaining pin 74 for rotating same in order to change the position of the nozzle 18 with respect to the flapper 16 so as to adjust the gain or proportional control of the pneumatic controller 10. Pressure is supplied from the primary restriction 44 through the conduit 43 to the communicating passages in the bearing 68 and axle 66 to the nozzle 18. Suitable O ring seals 76, 77 are provided about the axle for sealing the transverse passage formed therein and a like O ring 78 is provided in the bearing 68 to seal about the inlet passage from the conduit 43 into the bearing 68.

Referring to FIG. 5, there is illustrated a modification of the present invention demonstrating the versatility of the basic pneumatic controller. Like numerals have been used to designate like elements. The basic difference between the receiver controller illustrated in FIG. 5 and the pneumatic controller of FIGS. 1–4 is that a pressure responsive bellows 83 operatively connected to the first gimbal arm 26 is utilized to provide the input in place of the rotational adjustment of the shaft member 14. The input bellows 83 is connected to an arm member 84 in turn connected to a link arm 85 that is secured through the pin member 30 to the first gimbal arm 26. The basic set point adjustment may be provided through manual adjustment of the shaft member 14 to adjust the flapper with respect to the nozzle 18. Included in the receiver controller of FIG. 5 is a remote set point bellows 82 acting in opposition to the input bellows to adjust the first gimbal arm about the input axis.

In operation, the shaft member 14 may be rotated to provide for set point adjustment of the flapper with respect to the nozzle 18. Further adjustment of set point may be accomplished through application of pressure to the remote set point bellows 82. In operation, pressure supplied to the input bellows will cause movement of the first gimbal arm about the input axis tending to reposition the nozzle 18 with respect to the flapper 16. Fluid pressure fed back from the system will tend to actuate the feedback bellows 34 in order to stabilize the receiver controller at the new adjusted position of operation. The output pressure from the system then should be maintained responsive to the input pressure supplied to the bellows 83.

Turning to FIG. 6 there is illustrated a pneumatic controller 10 embodying the principles of the present invention which includes a process indicator in association therewith. The process indicator of FIG. 6 includes the same basic elements as shown in FIG. 1 and these have been identified with the same reference numerals. Added to the basic components of the pneumatic controller 10 are a block member 88 secured adjacent an end of a nozzle 90. The end of the nozzle 90 cooperates with a flapper member 92 carried on the axle 14 and movable with axle 14 and the flapper 16. Supply pressure is supplied from a conduit 94 through a restriction member 96 to the conduit 97 which supplies the pressure to the opening in the block 89 that communicates with the nozzle 90. The block 89 is operatively connected to a pressure responsive actuator or bellows 98 adapted to be connected to an indicator 99 via an arm 100. The indicator 99 cooperates with a scale 102 to read out a predetermined magnitude thereon in response to actuation of the bellows 98. The arm 100 is connected to the indicator 99 between an end pivoted to a fixed support and the pointer end. Mechanical link 103 is connected between the block 88 and indicator 99 for moving the end of nozzle 90 relative to flapper 92 to provide feedback action around the nozzle and flapper and the indicating linkage.

In operation, the input member 12 will be rotated in response to a first predetermined position, for example, a fluid level as sensed by a level responsive mechanism or a pressure value as sensed by a pressure responsive member. Rotation of the input member 12 and axle 14 will also cause movement of the flapper 92 relative to the nozzle 90. The changing pressure will be transmitted to the bellows 98, actuating the arm 100 and causing deflection of the indicator 99 with respect to the scale 102.

Turning now to FIGS. 7 and 8 there is illustrated the basic pneumatic controller of the present invention as applied to a square root extractor mechanism. The basic pneumatic controller may include an input member 12 secured to an axle 14 in turn connected to the flapper 16 for rotating same about the input axis. The nozzle 18 is mounted for rotation about the gain axis through means of the rotatable base member 22 and the flexible connection 24. The first gimbal arm 26 is adapted to be pivoted about the input axis and the second gimbal arm 28 is adapted to be pivoted about the feedback axis. Set point adjustment is provided by adjusting the first gimbal arm 26 with respect to the input axis.

The square root function of the present device results from relocating the feedback bellows 134 and having same cooperate with a flexure link 136 which is connected at one end to the base or frame 20 of the pneumatic controller and at the other end to the second gimbal arm 28. The flexure link 136 cooperating with the feedback bellows characterizes the output of the instrument. As the feedback bellows 134 expands, the amount of motion imparted to the second gimbal arm 28 is substantially proportional to the square root of the motion of the bellows arm 135.

In FIG. 8, the relationships between movement of the bellows 134 and the flexure link 136 may better be observed. The angle between the straight flexure link 136 and the position assumed by the flexure link upon expansion of the feedback bellows and the length of link 136 (dotted) is somewhat exaggerated for purposes of explanation. Utilizing the Pythagorean theorem, it is seen that $$Y^2 + \left(\frac{l}{2} - \frac{x}{2}\right)^2 = \left(\frac{l}{2}\right)^2$$

Solving for Y produces $$Y = \pm \sqrt{x\left(\frac{l}{2} - \frac{x}{4}\right)}$$

From this may be observed that the output pressure is approximately the square root of the input rotation.

In FIG. 9, there is shown a plot of percent output on the ordinate axis against a percent input on the abscissa axis. The output is in the range of 3 to 15 p.s.i. gauge and the input is on the range of 0 to 5 degrees rotation. The amount of error from 0 to 100 percent will be less than plus or minus one-half percent of span over the full span if $l$ is the greater than $25 \times$. In FIG. 10, there is shown a plot of percent of Y distance versus percent of output pressure. The percent of Y is on the ordinate axis and the percent of output pressure is along the abscissa axis. It is seen that there is a straight line relationship between the output motion of the bellows as plotted on the ordinate axis.

Thus, there has been provided by the present invention a basic pneumatic controller that is readily adapted to other forms of operation. The zero or starting point may be adjusted either manually or by means of pressure responsive bellows as desired. The gimbal arms or levers 26 and 28 are arranged with respect to each other and to the axis of rotation of the nozzle to maximize versatility of the device. That is, the gain axis, the input axis and the feedback axis are each substantially at right angles to one another as explained above. By rotating the nozzle 18 with respect to the flapper 16, an initial adjustment of gain or proportional control may be obtained without affecting the set point. Also, the pneumatic controller will allow gain adjustment with a minimum effect on the dynamic performance.

While we have shown presently preferred embodiments of the present invention, it is intended that the invention be limited only by the scope of the following claims.

We claim:

1. A pneumatic controller comprising in combination a base means, first lever means pivotable about a first axis in response to a first condition, second lever means on said first lever means pivotable about a second axis in response to a second condition, a nozzle on the base means rotatable about a third axis responsive to movement of the first and second lever means and a flapper means rotatable about said first axis and cooperating with said nozzle.

2. A pneumatic controller as in claim 1 wherein said first and second axes are in right angular relationship to one another.

3. A pneumatic controller as in claim 1 wherein said first axis is an input axis and said second axis is a feedback axis, said input axis and said feedback axis being at right angles to one another.

4. A pneumatic controller as in claim 3 wherein the nozzle is adjustable about the third axis to determine the relative position of the nozzle with respect to the flapper means to adjust the gain of the pneumatic controller, said third axis being the gain axis.

5. A pneumatic controller as in claim 4 wherein the third axis is substantially at right angles to both the input axis and the feedback axis.

6. A pneumatic controller as in claim 1 including a feedback bellows operatively affixed to the second lever means.

7. A pneumatic controller as in claim 6 including a reset bellows acting in opposition to the feedback bellows operatively affixed to the second lever means.

8. A pneumatic controller as in claim 1 including set point adjusting means operatively connected to said first lever means for selectively adjusting same.

9. A pneumatic controller as in claim 1 wherein said flapper means is rotatably adjustable about said third axis for adjusting the set point.

10. A pneumatic controller as in claim 9 wherein the first lever means is actuated by pressure response means including an input bellows and a remote set point bellows acting in opposition to the input bellows.

11. A pneumatic controller as in claim 1 including indicating means responsive to change in position of the flapper means.

12. A pneumatic controller as in claim 1 including a flexure member connected at one end to the base means and at the other end to the second lever means, feedback pressure means secured to the flexure member intermediate to its ends for actuating the flexure member to pivot the second lever means about the second axis, whereby the rotary movement of the flapper means about said first axis results in movement of the feedback pressure means upon the flexure member which is substantially proportional to the square of the distance moved by the second lever means.

13. A pneumatic controller comprising in combination a base means, first lever means pivotable about a first axis in response to a first condition, second lever means on said first lever means pivotable about a second axis in response to a second condition, a nozzle on the base means rotatable about a third axis and responsive to movement of the first and second lever means, said nozzle communicating with a source of fluid and flapper means rotatable about said first axis and cooperating with said nozzle to control the bleed of fluid from the nozzle.

References Cited

UNITED STATES PATENTS

| | | | |
|---|---|---|---|
| 2,585,347 | 2/1952 | Robins | 137—85 |
| 2,805,678 | 9/1957 | Panich | 137—86 |
| 3,095,003 | 6/1963 | Dyson | 137—86 |
| 3,354,895 | 11/1967 | Wisemann | 137—86 |
| 3,379,205 | 4/1968 | Schmitz | 137—86 |
| 3,448,753 | 6/1969 | Marucci | 137—86 |

ALAN COHAN, Primary Examiner